United States Patent
Kim

(10) Patent No.: US 7,555,289 B2
(45) Date of Patent: Jun. 30, 2009

(54) SUBWAY BROADCAST METHOD AND APPARATUS

(75) Inventor: Jae-Hyoung Kim, Anyang-shi (KR)

(73) Assignee: Samsung Electronics Co., Ltd. (KR)

( * ) Notice: Subject to any disclaimer, the term of this patent is extended or adjusted under 35 U.S.C. 154(b) by 968 days.

(21) Appl. No.: 10/701,666

(22) Filed: Nov. 5, 2003

(65) Prior Publication Data
US 2004/0259500 A1 Dec. 23, 2004

(30) Foreign Application Priority Data
Jun. 23, 2003 (KR) ...................... 10-2003-0040825

(51) Int. Cl.
*H04M 3/42* (2006.01)
(52) U.S. Cl. ................. 455/414.1; 455/414.2; 455/41.2; 455/414.3; 455/421; 455/406
(58) Field of Classification Search ............. 455/414.1, 455/41.2, 412.2, 414.3, 414.4, 421, 414.2, 455/406, 407, 408
See application file for complete search history.

(56) References Cited

U.S. PATENT DOCUMENTS

| 6,434,403 | B1 * | 8/2002 | Ausems et al. | ........... 455/556.2 |
| 7,050,790 | B2 * | 5/2006 | Yamaga | ................... 455/412.1 |
| 2002/0151366 | A1 * | 10/2002 | Walker et al. | ................. 463/42 |
| 2004/0171378 | A1 * | 9/2004 | Rautila | ....................... 455/419 |

* cited by examiner

*Primary Examiner*—Matthew D Anderson
*Assistant Examiner*—Minh D Dao
(74) *Attorney, Agent, or Firm*—The Farrell Law Firm, LLP

(57) ABSTRACT

A subway broadcast method and apparatus. The broadcast method for the subway broadcast apparatus for providing subway passengers with broadcast data that is received from a subway broadcast server providing a subway broadcast service over a wireless network, includes the steps of a) upon receiving a request signal from a Bluetooth terminal containing a Bluetooth chip, establishing a call setup mode with the Bluetooth terminal according to a Bluetooth scheme, b) responding to a pay-for-use content request message and user information received from the Bluetooth terminal, and transmitting the pay-for-use content request message and the user information to the subway broadcast server, c) receiving the pay-for-use content data requested over the wireless network from the subway broadcast server, and transmitting the received pay-for-use content data to the Bluetooth terminal, and d) if a power level of the Bluetooth terminal is lower than a reference power level, canceling the call setup mode associated with the Bluetooth terminal, and requesting the subway broadcast server to terminate execution of the pay-for-use content data. Therefore, subway passengers can receive a variety of pay-for-use contents from a plurality of content servers, such that they can select their desired broadcast program in a subway train.

12 Claims, 4 Drawing Sheets

SUBWAY BROADCAST METHOD AND APPARATUS

PRIORITY

This application claims priority to an application entitled "SUBWAY BROADCAST METHOD AND APPARATUS", filed in the Korean Intellectual Property Office on Jun. 23, 2003 and assigned Serial No. 2003-40825, the contents of which are hereby incorporated by reference.

BACKGROUND OF THE INVENTION

1. Field of the Invention

The present invention relates to a subway broadcast method and apparatus, and more particularly to a subway broadcast method and apparatus using a Bluetooth scheme.

2. Description of the Related Art

Typically, a predetermined number of broadcast devices are installed for every subway train to provide passengers with a broadcasting service. But, a current subway broadcast device provides all passengers with the same broadcasting service as in a public network. Therefore, the passengers have no ability to select a desired broadcasting program from among a plurality of broadcasting programs of the broadcasting service. Further, the current subway broadcast device provides passengers with only a video service between video and audio services, such that the passengers cannot hear any sound from the broadcasting program, resulting in an ineffective broadcasting program.

Although the current subway broadcast device displays caption data on a display screen to solve the above problem, the caption data is displayed to be later than corresponding video data, such that incorrect caption data corresponding to previous video data is displayed even though new video data begins to be displayed.

SUMMARY OF THE INVENTION

Therefore, the present invention has been made in view of the above problems, and it is an object of the present invention to provide a subway broadcast method and apparatus for allowing a passenger to select/hear a desired broadcasting program from among a plurality of broadcasting programs of a subway broadcasting service in all the subway trains.

It is another object of the present invention to provide a subway broadcast method and apparatus for transmitting a variety of pay-for-use contents received from content servers to passengers who request content data from the content servers.

It is yet another object of the present invention to provide a subway broadcast method and apparatus for transmitting video signals and a variety of contents to mobile communication terminals of subway passengers using a Bluetooth signal.

In accordance with one aspect of the present invention, the above and other objects can be accomplished by the provision of a subway broadcast apparatus, comprising: a receiver for receiving broadcast data containing subway common broadcast data and pay-for-use content data from a subway broadcast server providing users with a subway broadcast service over a wireless network; a display for displaying a video signal extracted from the common broadcast data received at the receiver; a Bluetooth unit for transmitting the pay-for-use content data and an audio signal extracted from the common broadcast data received at the receiver according to a Bluetooth scheme, and receiving a pay-for-use content request message and user authentication information from a mobile terminal containing a Bluetooth chip; a transmitter for transmitting the pay-for-use content request message and the user authentication information received from the Bluetooth unit to the subway broadcast server; and a controller for controlling the display, the Bluetooth unit, and the transmitter so as to broadcast the pay-for-use content data and the common broadcast data to the users according to the Bluetooth scheme.

In accordance with another aspect of the present invention, there is provided a subway broadcast method for a subway broadcast apparatus providing subway passengers with broadcast data that is received from a subway broadcast server providing a subway broadcast service over a wireless network, comprising the steps of: a) upon receiving a request signal from a Bluetooth terminal containing a Bluetooth chip, establishing a call setup mode with the Bluetooth terminal according to a Bluetooth scheme; b) responding to a pay-for-use content request message and user information received from the Bluetooth terminal, and transmitting the pay-for-use content request message and the user information to the subway broadcast server; c) receiving the pay-for-use content data requested over the wireless network from the subway broadcast server, and transmitting the received pay-for-use content data to the Bluetooth terminal; and d) if a power level of the Bluetooth terminal is lower than a reference power level, canceling the call setup mode associated with the Bluetooth terminal, and requesting the subway broadcast server to terminate execution of the pay-for-use content data.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
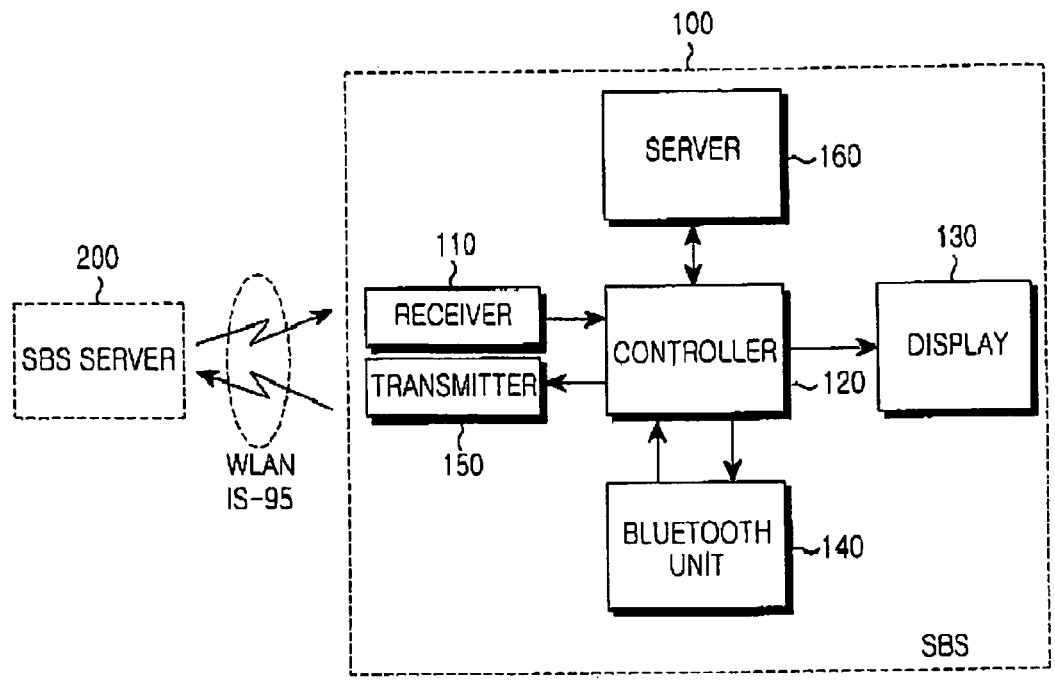
FIG. 1 is a block diagram of a subway broadcast apparatus in accordance with a preferred embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Prior to providing a detailed description of the present invention, a Bluetooth scheme for subway broadcast method and apparatus will hereinafter be described in detail.

The Bluetooth wireless technology is a representative example of wireless data communication technologies that are under development by Ericsson Corporation in Sweden, IBM Corporation in the United States, Nokia Corporation in Finland, and Toshiba in Japan, and has a primary objective to implement wireless data communication having a maximum transfer rate of 1 Mbps and a maximum transfer distance of 10 m.

The transfer rate of 1 Mbps can be easily implemented at low cost using an ISM (Industrial Scientific Medical) band of 2.4 GHz available for users having no legal permission. The transfer distance of 10 m is an example of a transmission distance between a mobile terminal of a user and its fixed device in an office or home environment.

The Bluetooth scheme can transmit not only text data but also audio data using a CVSD (Continuous Variable Slope Delta Modulation) process functioning as a speech coding scheme, and adapts an encryption algorithm to maintain communication security.

The biggest advantage of the Bluetooth scheme is that it allows a user having a mobile communication terminal carried in his or her pocket or bag to communicate with other communication equipment. For example, the user can transfer video data captured by a digital camera to other users located within a prescribed distance without data modulation. In more detail, there is no need for the user to connect a digital camera with either a computer or a mobile phone using a cable, such that the user can immediately transfer desired video data to a prescribed data receiver using the Bluetooth scheme.

A telephone comprised of a cellular phone module, a pager module, and a PDA module can be implemented using such Bluetooth scheme. Such a telephone can function as a household mobile phone or an office mobile phone. The telephone quickly establishes synchronization with information stored in a desktop or notebook computer, transmits/receives facsimile messages, and controls a desired message to be printed on a printer. Further, the telephone can be fully interoperable with all portable and fixed computer devices, however, such computer devices each should have a low-priced transceiver chip to implement such an interoperable telephone.

The Bluetooth chip is implemented to perform data transmission/reception at a frequency band of 2.45 GHz available throughout the world. Of source, it should be noted that some countries may use other frequency bands slightly different from the frequency band of 2.45 GHz. The Bluetooth chip can use three maximum voice channels other than data channels. Point-to-point access or point-to-multipoint access is established using such a Bluetooth chip. A maximal communication distance is set to 10 m. Data transmission is established at a prescribed transfer rate of 1 Mbps. Such data transmission can be extended to a transfer rate of 2 Mbps using the second-generation technology. A frequency-hop scheme for the Bluetooth chip enables a plurality of devices to communicate with each other even in a region having an EMI (Electromagnetic Interference) problem.

A subway broadcast method and apparatus according to the present invention communicates data between an intra-train broadcast device and a mobile communication terminal that contain such a Bluetooth chip.

FIG. 1 is a block diagram of a SBS (Subway Broadcast System) in accordance with a preferred embodiment of the present invention. The SBS receives data from a SBS server 200 over a wireless network, for example, a WLAN (Wireless Local Access Network) and an IS-95 (Interim Standard-95) network, etc., and broadcasts the received data to subway passengers. Preferably, an intra-train broadcast device (also called a SBS) is adapted as such a SBS. FIG. 1 shows an example of such an intra-train broadcast device.

Referring to FIG. 1, the SBS 100 includes a receiver 110, a controller 120, a display 130, a Bluetooth unit 140, a transmitter 150, and a server 160.

The receiver 110 receives broadcast data from the SBS server 200 over a wireless network (e.g., a WLAN, and an IS-95, etc.). In this case, there are two kinds of such broadcast data received from the receiver 110, that is, pay-for-use content data, and common broadcast data.

The controller 120 controls overall operations of the SBS 100 to broadcast pay-for-use content data and common broadcast data received from the receiver 110 to users using a Bluetooth scheme.

The SBS server 200 adds prescribed ID information identifiable by the controller 120 to the broadcast data when transferring the broadcast data to the SBS 100. For example, ID information for identifying individual data is added to the broadcast data, and the broadcast data having the ID information is transmitted to the SBS 100. In this case, provided that the broadcast data is pay-for-use content data, the SBS server 200 adds information of a user who requests the pay-for-use content data to corresponding broadcast data, and transmits the broadcast data having the user information to the SBS 100.

The present invention does not describe in detail such a method for adding ID information to broadcast data. Namely, the present invention may include various methods for adding the ID information to the broadcast data, because a variety of pay-for-use content services using a wireless network are currently supplied to users simultaneously with adding prescribed ID information to the pay-for-use content data to identify individual data receivers. The method for adding ID information to broadcast data can be replaced with a method for adding ID information identifying individual receivers to pay-for-use content data in a pay-for-use content service over the wireless network.

The controller 120 reads ID information contained in the broadcast data received from the receiver 110, and entirely controls the SBS 100 according to the broadcast data. For example, pay-for-use content data of reception data received at the receiver 110 is transmitted to the Bluetooth unit 140. In the meantime, common broadcast data contained in the reception data is divided into an audio signal and a video signal. The video signal is transmitted to the display 130, and the audio signal is transmitted to the Bluetooth unit 140.

The controller 120 receives user authentication information and a pay-for-use content request message from the Bluetooth unit 140, and transmits them to the transmitter 150.

The display 130 is controlled by the controller 120, and displays a video signal of SBS common broadcast data.

The Bluetooth unit 140 is controlled by the controller 120, converts pay-for-use content data into a Bluetooth signal, and transmits it to a user requesting the pay-for-use content data. The Bluetooth unit 140 transmits the pay-for-use content request message and the user authentication information received from a mobile terminal having a Bluetooth chip to the transmitter 150. The Bluetooth unit 140 will hereinafter be described with reference to FIG. 2.

The transmitter 150 is controlled by the controller 120, and transmits data created from the SBS 100 to the SBS server 200. For example, the transmitter 150 transmits the pay-for-use content request message and the user authentication information received from the Bluetooth unit 140 to the SBS server 200.

The server 160 decodes video and audio signals received from the SBS server 200, controls the display 130 to display the decoded video signal, encodes the Bluetooth information of a terminal, and transmits the encoded information to the SBS server 200.

Figure 2:
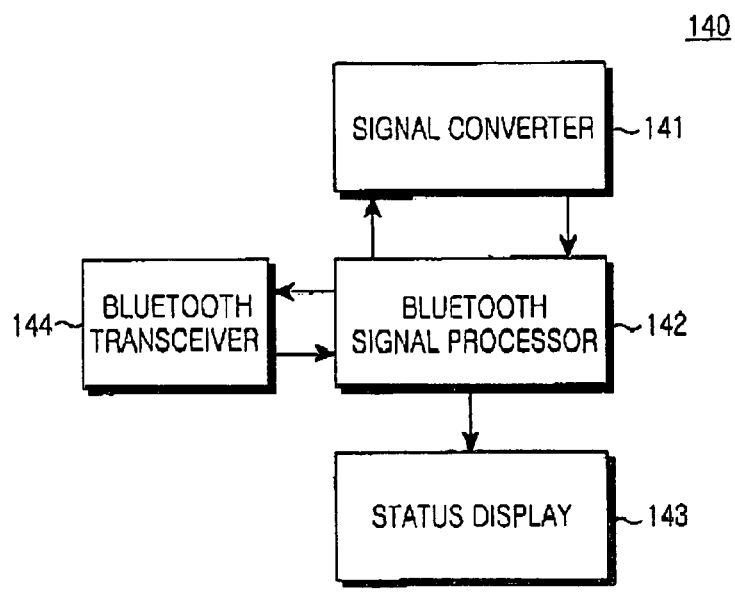
FIG. 2 is a block diagram of a Bluetooth unit in accordance with a preferred embodiment of the present invention.

FIG. 2 is a block diagram of the Bluetooth unit 140 in accordance with a preferred embodiment of the present invention. The Bluetooth unit 140 includes a signal converter 141, a Bluetooth signal processor 142, a status display 143, and a Bluetooth transceiver 144.

The signal converter 141 converts data of a typical wireless network (e.g., a WLAN and an IS-95 network, etc.) into a Bluetooth signal. For example, the signal converter converts either pay-for-use content data received over the typical wireless network or an audio signal of common broadcast data into a Bluetooth signal. The pay-for-use content request message and the user authentication information received from the Bluetooth transceiver 144 are converted into typical wireless network data.

The Bluetooth signal processor 142 receives the pay-for-use content data or the audio signal of common broadcast data converted into the Bluetooth signal from the signal converter 141, and transmits them to the Bluetooth transceiver 144. Also, the pay-for-use content request message and the user authentication information received from the Bluetooth transceiver 144 are transmitted to the signal converter 141. The Bluetooth signal processor 142 analyzes processing information (e.g., transmission/reception information) of the Bluetooth signal, and transmits resultant data to the status display 143.

The status display 143 receives the processing information of the Bluetooth signal from the Bluetooth signal processor 142, and displays a transmission/reception state of the Bluetooth signal on the basis of the received processing information. For example, the status display 143 may contain LEDs (Light Emitting Diodes) having different colors, such that processing capacity information, reception status information, and transmission status information can be separately displayed on different LEDs.

The Bluetooth transceiver 144 transmits or receives the Bluetooth signal to/from mobile terminals each having a Bluetooth chip. For example, the Bluetooth transceiver 144 transmits either the pay-for-use content data or the audio signal of common broadcast data received from the Bluetooth signal processor 142 to the mobile terminals according to a Bluetooth scheme. The Bluetooth transceiver 144 transmits the pay-for-use content data to a user requesting it according to the Bluetooth scheme, and broadcasts an audio signal of common broadcast data to unspecified people carrying their mobile terminals each having a Bluetooth chip. The Bluetooth transceiver 144 receives the pay-for-use content request message and the user authentication information from such mobile terminals, and transmits them to the Bluetooth signal processor 142.

Figure 3:
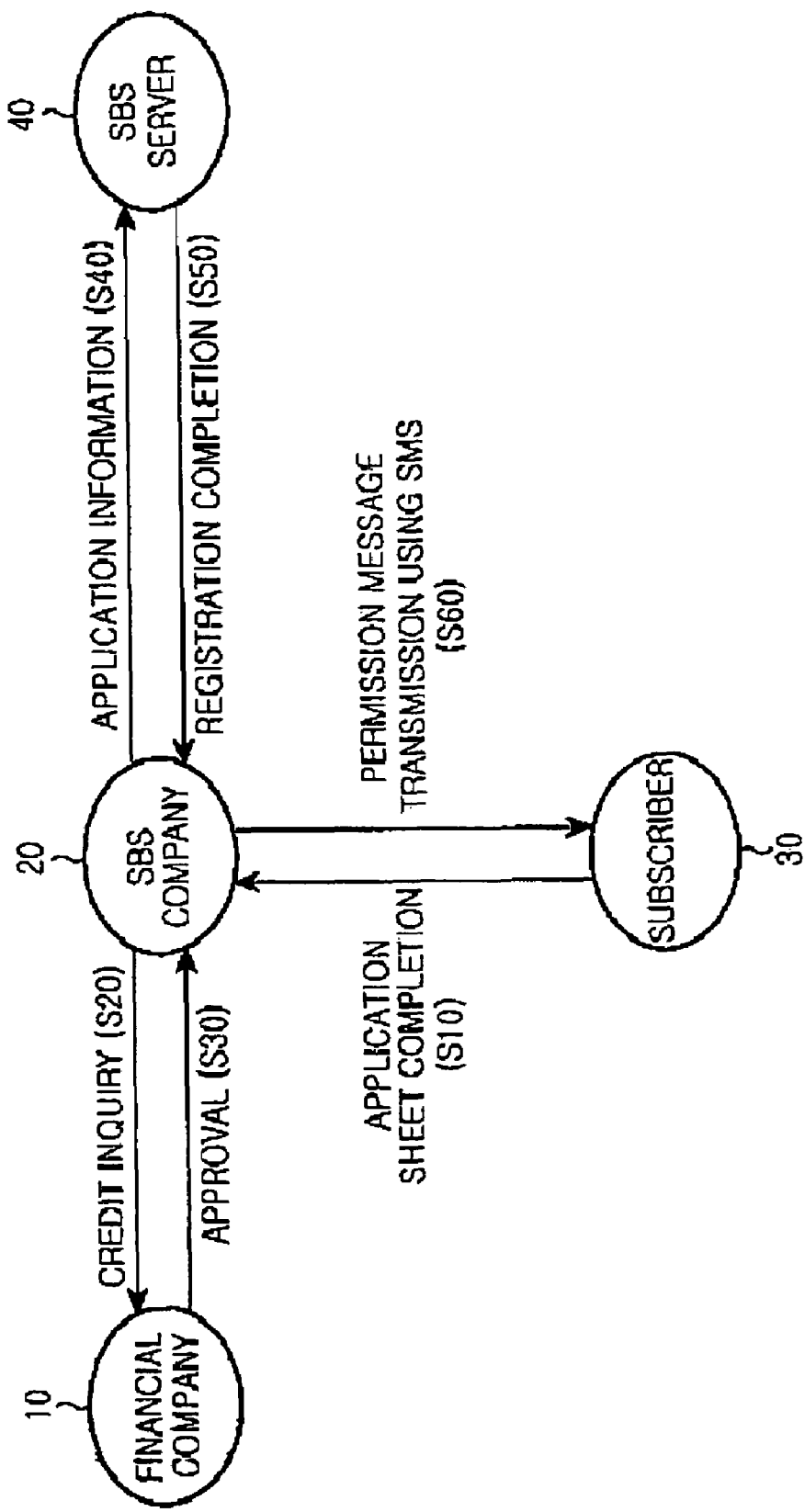
FIG. 3 is a conceptual diagram illustrating a method for performing subscriber registration to a pay-for-use content service to establish a subway broadcasting service in accordance with a preferred embodiment of the present invention.

FIG. 3 depicts a conceptual diagram illustrating a method for performing subscriber registration to a pay-for-use content service to establish a subway broadcasting service in accordance with a preferred embodiment of the present invention. Provided that a user wishes to use prescribed pay-for-use content data (e.g., music broadcast data, English education broadcast data, or sports news, etc.) in a subway train, the user must be previously registered to a prescribed pay-for-use content service.

Referring to FIG. 3, a subscriber 30 who wishes to use such a pay-for-use content service transmits prescribed information (e.g., a mobile phone number, a Bluetooth ID, desired content information such as a broadcast service, and a password, etc.) to a SBS company 20, and requests a prescribed pay-for-use content server to register himself or herself as a member at step S10. The SBS company 20 queries a financial company 10 about credit information of the subscriber at step S20 upon receiving the registration information of the subscriber. The SBS company 20 receives a message indicating that there is no problem in the received credit information from the financial company 10 at step S30. Application information (e.g., desired content information, a phone number, and a password, etc.) of the subscriber 30 is transmitted to the SBS server 40 at step S40, the SBS server 40 transmits a registration completion message to the SBS company 20 at step S50, and then the SBS company 20 transmits a permission message to the subscriber 30 using a SMS (Short Message Service) at step S60. In other words, the SBS company 20 transmits the permission message indicating that the subscriber 30 can use his or her requested pay-for-use contents to the subscriber 30 using the SMS.

The aforementioned method for registering the subscriber (also called a user) to a pay-for-use content service as a member is similar to a typical user registration process. Therefore, it should be noted that the method shown in FIG. 3 is not limited to a pay-content-service registration process based on the inventive subway broadcast method. For example, if a user uses a pay-content-service, a SBS company should identify a credit status of the user. Thus, credit information and admission therefor are required. On the other hand, if the SBS company provides only free of charge service, then the credit status of the user is not required.

Figure 4:
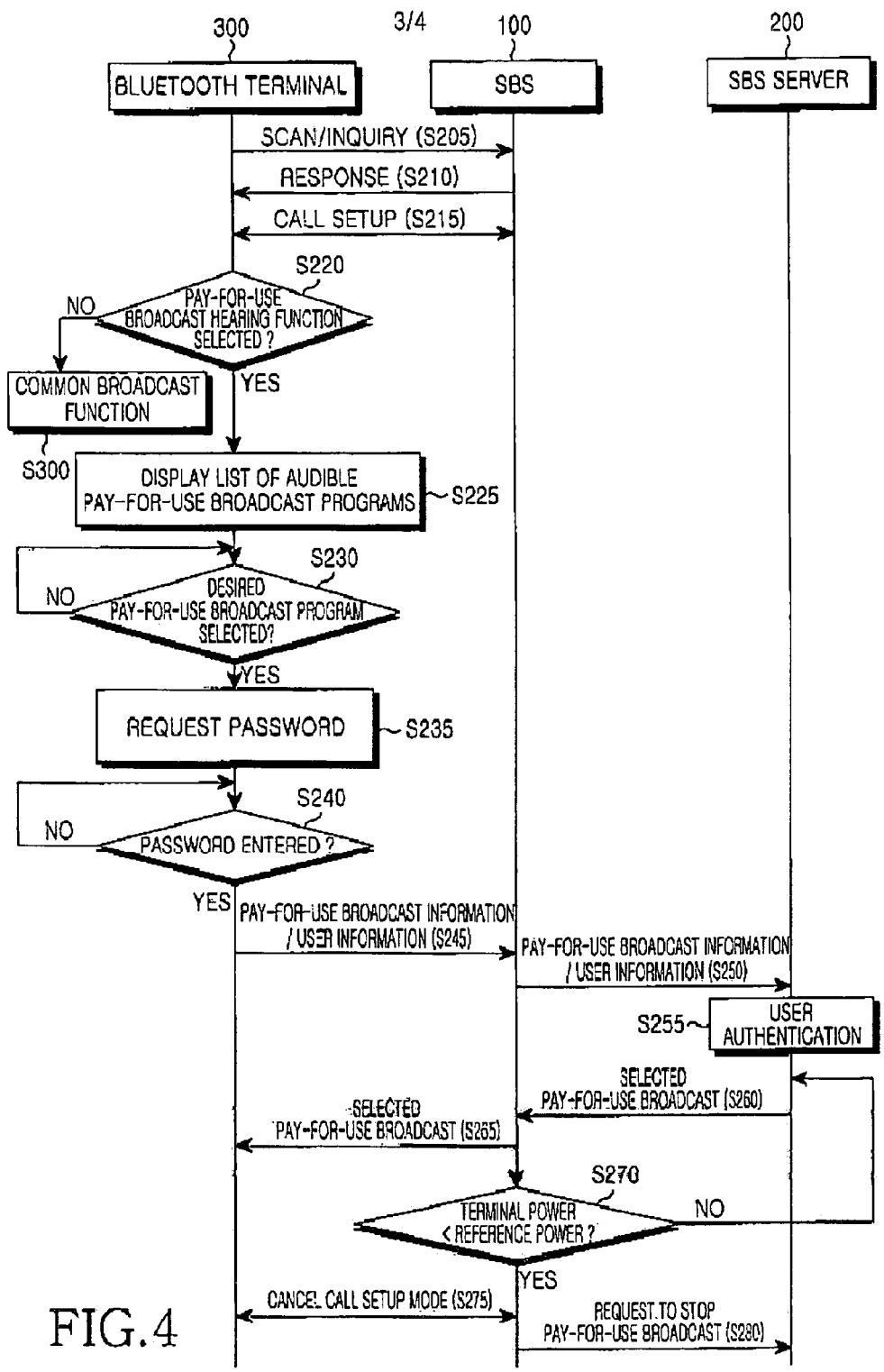
FIG. 4 is a flow chart illustrating a pay-for-use broadcast method for subway trains in accordance with a preferred embodiment of the present invention.

FIG. 4 is a flow chart illustrating a pay-for-use broadcast method for subway trains in accordance with a preferred embodiment of the present invention.

Referring to FIG. 4, a mobile terminal having a Bluetooth chip (hereinafter referred to as a Bluetooth terminal) 300 communicates with the SBS 100 according to a Bluetooth scheme, and the SBS 100 communicates with the SBS server 200 over a typical wireless network. In this case, the Bluetooth terminal 300 functions as a slave, and the SBS 100 functions as a master. The slave and the master for the Bluetooth scheme correspond to a client and a server for a client/server scheme, respectively. To perform communication between the slave and the master in the Bluetooth scheme, the master answers a request from the slave.

The Bluetooth terminal 300 performs scan and inquiry commands at intervals of a predetermined time (e.g., 10.24 sec) at step S205. The slave finds a counterpart terminal (e.g., the master) using the Bluetooth scheme at step S205. This method for controlling the slave to find the master is typically performed in the Bluetooth scheme.

If the SBS 100 answers the scan and inquiry commands of the Bluetooth terminal 300 at step S210, a call setup mode is established between the Bluetooth terminal 300 and the SBS 100 at step S215. The scan and inquiry commands of the slave in the Bluetooth scheme are effective within a radius of about 5~10 m. Therefore, if such a call setup mode is established between the Bluetooth terminal 300 and the SBS 100 at step S215, this means that a user carrying the Bluetooth terminal 300 is a passenger of a subway train.

In this way, if the user selects a pay-for-use broadcast listening service using the Bluetooth terminal 300 at step S220 after establishing the call setup mode at step S215, then the Bluetooth terminal 300 displays category information of pay-for-use broadcast programs available to the user at step S225. Therefore, the Bluetooth terminal 300 of the user must previously store information of a pay-for-use broadcast service where the user is a registered member. Therefore, if a registration step to a prescribed pay-for-use content server is completed using the method shown in FIG. 3, it is preferable for the SBS company 20 to transmit pay-for-use broadcast information corresponding to the pay-for-use content server to the Bluetooth terminal 300.

If the user selects a desired pay-for-use broadcast program from among a plurality of displayed broadcast programs at step S230, then the Bluetooth terminal 300 requests the user to enter a password for performing user authentication associated with the selected pay-for-use broadcast program at step 235. If the user enters the password using the Bluetooth terminal 300 at step S240, the Bluetooth terminal 300 transmits user information (e.g., a phone number and a password) and pay-for-use broadcast information selected by the user to the SBS 100 at step S245. In this case, the Bluetooth terminal 300 communicates with the SBS 100 using the Bluetooth scheme.

The SBS 100 transmits the user information and the pay-for-use broadcast information selected by the user to the SBS server 200 over a typical wireless network at step S250.

Upon receipt of the user information and the pay-for-use broadcast information from the SBS 100, the SBS server 200 performs user authentication at step S255. In more detail, it is determined at step S255 that the user has previously registered as a member in a server of the selected pay-for-use broadcast information.

If it is determined at step S255 that the user is a registered member of the selected pay-for-use broadcast information, the SBS server 200 transmits the selected pay-for-use broadcast information to the SBS 100 at step S260. In this case, the SBS server 200 transmits pay-for-use broadcast information to the SBS 100 over a typical wireless network. There are various pay-for-use broadcast information types received from the SBS server 200, for example, audio or video information, still image information, and moving picture information, etc.

The SBS 100 receives the pay-for-use broadcast information from the SBS server 200, and transmits it to the Bluetooth terminal 300 at step S265. In this case, the SBS 100 transmits pay-for-use broadcast information to the Bluetooth terminal 300.

The SBS 100 transmits the pay-for-use broadcast information to the Bluetooth terminal 300 only when the user carrying the Bluetooth terminal 300 is a passenger of a subway train. The SBS 100 determines at step S270 whether the user carrying the Bluetooth terminal 300 is a passenger of a subway train on the basis of the magnitude of power (also called a terminal power) transmitted from the Bluetooth terminal 300.

For example, if the power level of the Bluetooth terminal 300 is higher than a prescribed power level, the SBS 100 determines that the user carrying the Bluetooth terminal 300 is a passenger of a subway train, the pay-for-use broadcast information received from the SBS server 200 is continuously transferred to the Bluetooth terminal 300. Otherwise, if the power level of the Bluetooth terminal 300 is lower than the prescribed power level at step S270, a call setup mode between the Bluetooth terminal 300 and the SBS 100 is canceled at step S275, and the SBS 100 requests the SBS server 200 to interrupt the pay-for-use broadcast program at step S280.

Unless the user selects the pay-for-use broadcast service on condition that the call setup mode is established between the Bluetooth terminal 300 and the SBS 100 at step S215, the Bluetooth terminal 300 performs a common broadcast function at step S300.

A method for controlling the Bluetooth terminal 300 to perform the common broadcast function in a subway train will hereinafter be described with reference to FIG. 5.

Figure 5:
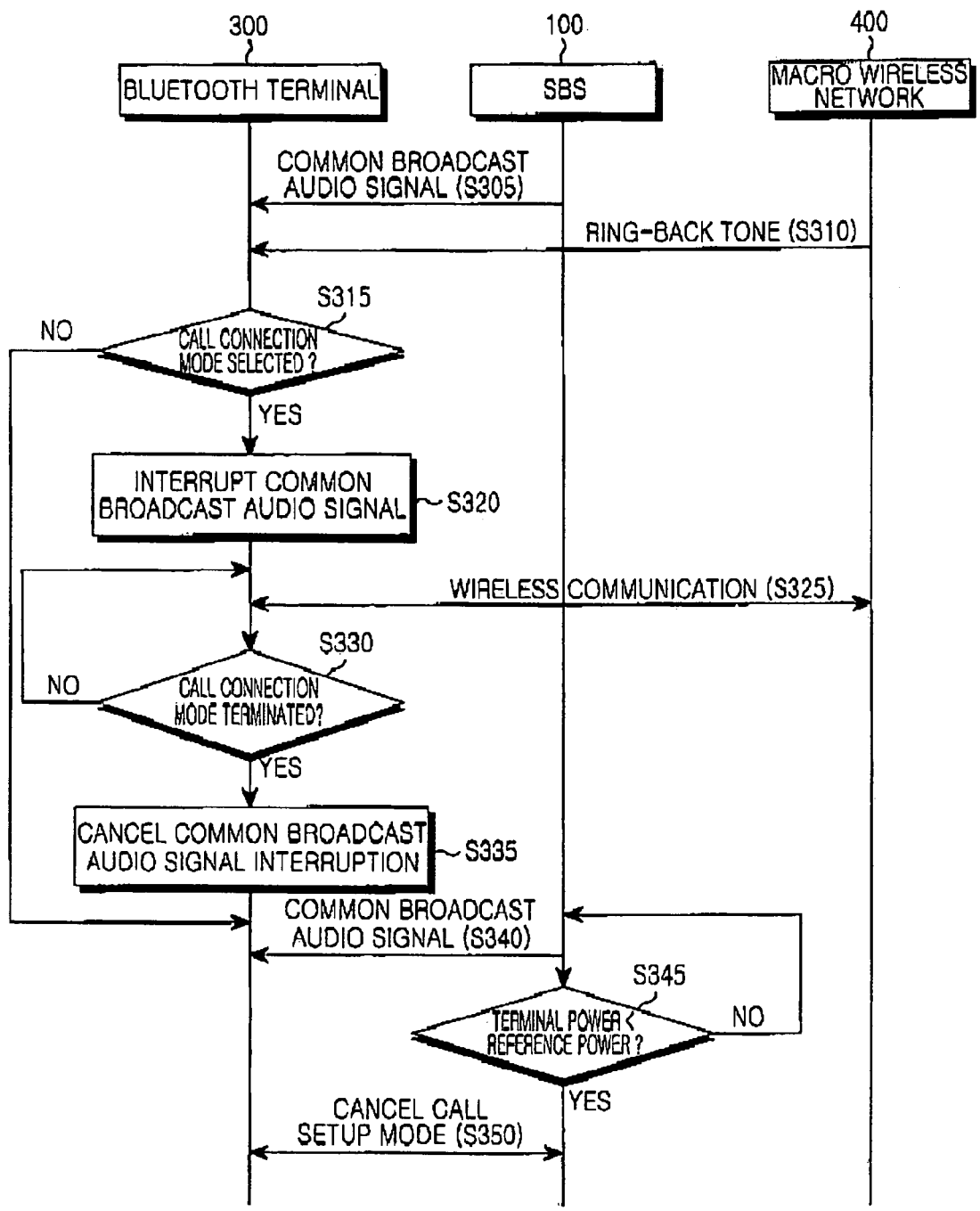
FIG. 5 is a flow chart illustrating a common broadcast method for subway trains in accordance with a preferred embodiment of the present invention.

FIG. 5 is a flow chart illustrating such a common broadcast method for subway trains in accordance with a preferred embodiment of the present invention. Referring to FIGS. 4 and 5, unless the Bluetooth terminal 300 establishing a call setup mode with the SBS 100 at step S215 selects the pay-for-use broadcast service, the SBS 100 transmits a common broadcast audio signal to the Bluetooth terminal 300 at step S305.

As previously stated in FIG. 1, the SBS 100 divides common broadcast data received from the SBS server 200 into a video signal and an audio signal, and transmits the audio signal to the Bluetooth terminal 300 using the Bluetooth scheme.

When the Bluetooth terminal 300 receives a ring-back tone from a macro wireless network 400 at step S310 while receiving the common broadcast audio signal from the SBS 100, and the user selects a call connection function, the Bluetooth terminal 300 prevents the common broadcast audio signal from being received from the SBS 100 at step S320, and wirelessly communicates with the macro wireless network 400 at step S325. When the call connection function is terminated at step S330, the common broadcast audio signal is no longer interrupted at step S335, and the Bluetooth terminal 300 receives the common broadcast audio signal from the SBS 100 at step 340.

In this case, the SBS 100 transmits common broadcast audio data to a user carrying the Bluetooth terminal 300 when the user is a passenger of a subway train. A method for determining whether the user carrying the Bluetooth terminal 300 is a passenger of the subway train is equal to a pay-for-use broadcast method. In more detail, the SBS 100 determines at step S345 whether the user carrying the Bluetooth terminal 300 is a passenger of a subway train upon receiving a power level (i.e., a terminal power level) from the Bluetooth terminal 300.

For example, if a power level of the Bluetooth terminal 300 is higher than a prescribed power level, it is determined that the user carrying the Bluetooth terminal 300 is a passenger of a subway train, so that the SBS 100 continuously provides the Bluetooth terminal 300 with common broadcast audio data. Otherwise, if a power level of the Bluetooth terminal 300 is lower than a prescribed power level, the SBS 100 cancels the call setup mode associated with the Bluetooth terminal 300 at step S350 to terminate common broadcast audio data transmission.

In the meantime, if the Bluetooth terminal 300 receives a call connection request from the macro wireless network 400 when receiving the common broadcast data, it performs steps S310 to S335. These steps S310 to S335 are also performed even when the Bluetooth terminal 300 receives pay-for-use broadcast data.

As apparent from the above description, the inventive subway broadcast method and apparatus provides subway passengers with a variety of pay-for-use contents received from a plurality of content servers to allow the passengers to select/hear their desired broadcast program in a subway train, such that the passengers can effectively use their time in a subway train.

Further, the subway broadcast method and apparatus provides some passengers with audio signals of common broadcast data using their Bluetooth terminals, such that the remaining passengers who do not wish to hear the audio signals do not feel inconvenienced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A subway broadcast apparatus, comprising:
   a receiver for receiving broadcast data containing subway common broadcast data and pay-for-use content data from a subway broadcast server providing users with a subway broadcast service over a wireless network;
   a display for displaying a video signal extracted from the common broadcast data received at the receiver;
   a Bluetooth unit for transmitting the pay-for-use content data and an audio signal extracted from the common broadcast data received at the receiver according to a Bluetooth scheme, and receiving a pay-for-use content request message and user authentication information from a mobile terminal containing a Bluetooth chip;
   a transmitter for transmitting the pay-for-use content request message and the user authentication information received from the Bluetooth unit to the subway broadcast server; and
   a controller for controlling the display, the Bluetooth unit, and the transmitter so as to broadcast the pay-for-use content data and the common broadcast data to the users according to the Bluetooth scheme.

2. The apparatus as set forth in claim 1, wherein the receiver receives broadcast data which is classified into pay-for-use data and common broadcast data on the basis of ID (IDentification) information determined by the subway broadcast server.

3. The apparatus as set forth in claim 2, wherein the controller reads the ID information contained in the broadcast data, transmits the read ID information to the Bluetooth unit, divides the common broadcast data into an audio signal and a video signal, transmits the video signal to the display, and transmits the audio signal to the Bluetooth unit.

4. The apparatus as set forth in claim 1, wherein the Bluetooth unit includes:
   a signal convener for converting an audio signal extracted from the common broadcast data received at the receiver and pay-for-use content data into a Bluetooth signal, and converting a pay-for-use content request message and user authentication information received from another Bluetooth terminal into wireless network data;
   a Bluetooth transceiver for transmitting/receiving the Bluetooth signal to/from a plurality of Bluetooth enabled mobile terminals; and
   a Bluetooth signal processor for transmitting either the audio signal of the common broadcast data convened into the Blue signal or the pay-for-use content data to the Bluetooth transceiver, and transmitting the pay-for-use content request message and the user authentication information received from the Bluetooth transceiver to the signal convener.

5. The apparatus as set forth in claim 4, wherein the Bluetooth signal processor analyzes transmission/reception state information of the Bluetooth signal and processing capacity information upon receiving result signals from the signal converter and the Bluetooth transceiver, and displays the analyzed result.

6. The apparatus as set forth in claim 5, wherein the Bluetooth unit further includes a status display for displaying the analyzed result of the Bluetooth signal processor adapted to process the transmission/reception state information of the Bluetooth signal and the processing capacity information.

7. The apparatus as set forth in claim 4, wherein the Bluetooth transceiver transmits pay-for-use content data received from the Bluetooth signal processor to a user requesting the pay-for-use content data, and broadcasts the audio signal of the communication broadcast data received from the Bluetooth signal processor to unspecified Bluetooth enabled mobile terminals.

8. A subway broadcast method for a subway broadcast apparatus providing subway passengers with broadcast data that is received from a subway broadcast server providing a subway broadcast service over a wireless network, comprising the steps of:
   a) upon receiving a request signal from a Bluetooth terminal containing a Bluetooth chip, establishing a call setup mode with the Bluetooth terminal according to a Bluetooth scheme;
   b) responding to a pay-for-use content request message and user information received from the Bluetooth terminal, and transmitting the pay-for-use content request message and the user information to the subway broadcast server;
   c) receiving the pay-for-use content data requested over the wireless network from the subway broadcast server, and transmitting the received pay-for-use content data to the Bluetooth terminal; and
   d) if a power level of the Bluetooth terminal is lower than a reference power level, canceling the call setup mode associated with the Bluetooth terminal, and requesting the subway broadcast server to terminate execution of the pay-for-use content data.

9. The method as set forth in claim 8, wherein the step (b) includes the steps of:
   converting data received from the Bluetooth terminal according to the Bluetooth scheme into wireless network data, and transmitting the converted data to the subway broadcast server.

10. The method as set forth in claim 8, wherein the step (c) includes the steps of:
    converting data serving as wireless network data received from the subway broadcast server into a Bluetooth signal, and transmitting the converted data to the Bluetooth terminal.

11. The method as set forth in claim 8, further comprising the steps of:
    e) if the pay-for-use content data request message and the user information are not received from the Bluetooth terminal after establishing the call setup mode at the step (a), receiving common broadcast data from the subway broadcast server;
    f) classifying the communication broadcast data into a video signal and an audio signal; and
    g) providing the Bluetooth terminal with the audio signal classified at the step (b).

12. The method as set forth in claim 11, wherein the step (g) includes the step of:
    providing the Bluetooth terminal with the audio signal according to the Bluetooth scheme.

* * * * *